(12) United States Patent
Stojanovic et al.

(10) Patent No.: US 8,139,675 B2
(45) Date of Patent: *Mar. 20, 2012

(54) MULTI-TONE SYSTEM WITH OVERSAMPLED PRECODERS

(75) Inventors: Vladimir M. Stojanovic, Lexington, MA (US); Amir Amirkhany, Stanford, CA (US); Jared L. Zerbe, Woodside, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/907,937

(22) Filed: Oct. 19, 2010

(65) Prior Publication Data

US 2011/0150051 A1    Jun. 23, 2011

Related U.S. Application Data

(63) Continuation of application No. 11/022,468, filed on Dec. 22, 2004, now Pat. No. 7,817,743.

(51) Int. Cl.
*H04L 27/00* (2006.01)
(52) U.S. Cl. ........ 375/295; 375/260; 375/229; 375/222; 375/240.29
(58) Field of Classification Search .......... 375/260, 375/295, 229, 222, 240.29
See application file for complete search history.

(56) References Cited

U.S. PATENT DOCUMENTS

| | | | |
|---|---|---|---|
| 5,717,619 A | 2/1998 | Spurbeck et al. | 708/319 |
| 5,852,630 A | 12/1998 | Langberg et al. | 375/219 |
| 5,881,107 A | 3/1999 | Termerinac et al. | 375/279 |
| 5,909,463 A | 6/1999 | Johnson et al. | 375/220 |
| 6,028,891 A | 2/2000 | Ribner et al. | 375/222 |
| 6,169,768 B1 | 1/2001 | Okada et al. | 375/316 |
| 6,408,022 B1 | 6/2002 | Fertner | 375/230 |
| 6,553,398 B2 | 4/2003 | Capofreddi | 708/319 |
| 6,665,349 B1 | 12/2003 | Cherubini et al. | 375/261 |
| 6,687,291 B1 | 2/2004 | Lee et al. | 375/229 |

(Continued)

FOREIGN PATENT DOCUMENTS

GB    2 271 693 A    4/1994

(Continued)

OTHER PUBLICATIONS

International Search Report for International Application No. PCT/US2005/038706 mailed Mar. 3, 2006.

(Continued)

*Primary Examiner* — Kenneth Lam
(74) *Attorney, Agent, or Firm* — Morgan, Lewis & Bockius LLP (57) ABSTRACT

A multi-tone system includes a data transmission circuit with an interface for receiving a data stream for transmission, a data steam splitter that splits the data stream to produce multiple substreams and a plurality of parallel data preparation circuits. Each data preparation circuit prepares a respective substream for transmission and generates a respective sub-channel signal. At least a first data preparation circuit of the plurality of parallel data preparation circuits includes a first analog filter for filtering a first substream. The first analog filter operates at a sample rate greater than the respective symbol rate of the first substream. The first analog filter provides pre-emphasis of the respective sub-channel signal and attenuation of signals outside of a respective band of frequencies corresponding to the respective sub-channel signal. The data transmission circuit also includes a combiner for combining respective sub-channel signals to generate a data transmission signal.

22 Claims, 10 Drawing Sheets

U.S. PATENT DOCUMENTS

| | | | |
|---|---|---|---|
| 6,816,097 B2 | 11/2004 | Brooks et al. | 341/143 |
| 6,856,590 B2 | 2/2005 | Okada et al. | 370/208 |
| 7,016,739 B2 | 3/2006 | Bange et al. | 607/60 |
| 7,027,536 B1 | 4/2006 | Al-Dhahir | 375/347 |
| 7,817,743 B2 * | 10/2010 | Stojanovic et al. | 375/295 |
| 2002/0023115 A1 | 2/2002 | Kanasugi et al. | 708/313 |
| 2002/0027950 A1 | 3/2002 | Matthews | 375/222 |
| 2002/0105901 A1 | 8/2002 | Chini et al. | 370/206 |
| 2002/0176510 A1 | 11/2002 | Laroia | 375/267 |
| 2003/0063686 A1 | 4/2003 | Giardina et al. | 375/296 |
| 2003/0063759 A1 | 4/2003 | Brennan et al. | 381/92 |
| 2003/0081693 A1 | 5/2003 | Raghavan et al. | 375/298 |
| 2003/0087634 A1 | 5/2003 | Raghavan et al. | 455/423 |
| 2003/0112896 A1 | 6/2003 | Raghavan et al. | 375/322 |
| 2003/0134607 A1 | 7/2003 | Raghavan et al. | 455/132 |
| 2004/0071205 A1 | 4/2004 | Gorecki | 375/232 |
| 2004/0110519 A1 | 6/2004 | Chang et al. | 455/502 |
| 2005/0052304 A1 | 3/2005 | Trotter et al. | 341/152 |
| 2006/0018344 A1 | 1/2006 | Pamarti | 370/480 |

FOREIGN PATENT DOCUMENTS

WO     WO 02/28045 A1     4/2002

OTHER PUBLICATIONS

Kim, J., et al., "A 2-Gb/s/pin Source Synchronous CDMA Bus Interface with Simultaneous Multi-Chip Access and Reconfigurable I/O Capability," Proceedings of the IEEE 2003 Custom Integrated Circuits Conf., Sep. 21-24, 2003, pp. 317-320.

Xu, Z., et al., "A 2.7 Gb/s CDMA-Interconnect Transceiver Chip Set with Multi-Level Signal Data Recovery for Reconfigurable VLSI Systems," Digest of Technical Papers: Int'l Solid State Circuits Conf., San Francisco, CA, Feb. 9-13, 2003, vol. I, pp. 82-83.

Amirkhany, A., et al., "Multi-Tone Signaling for High-Speed Backplane Electrical Links," Feb. 29, 2004, 7 pages.

\* cited by examiner

MULTI-TONE SYSTEM WITH OVERSAMPLED PRECODERS

RELATED APPLICATIONS

This application is a continuation of U.S. patent application Ser. No. 11/022,468, filed Dec. 22, 2004 now U.S. Pat. No. 7,817,743, entitled "Multi-Tone System with Oversampled Precoders," which is incorporated by reference herein in its entirety.

BRIEF DESCRIPTION OF THE INVENTION

The present invention relates generally to the communication of data. More specifically, the present invention relates to the communication of data in a multi-tone system with oversampled precoders.

BACKGROUND OF THE INVENTION

In multi-tone systems, in order to maximize bandwidth utilization, and thus achieve a maximum transmission data rate, filtering sub-channel signals within a sub-channel is often required to minimize inter-symbol interference (ISI). In addition, sharp filtering of signals between sub-channels and/or complex matrix equalization is often required to minimize inter-channel interference (ICI). At high data rates, however, digital filtering is complex, costly and consumes significant amounts of power. While analog filters consume less power, using analog filters in conjunction with matrix equalization can be cumbersome, complex and costly. In particular, this is a challenge when multi-tone sub-channels are closely spaced in frequency. Furthermore, the non-linear phase responses of many sharp analog filters may further increase ISI, thereby requiring even more complex matrix equalization. There is a need, therefore, for improved analog filtering and matrix equalization in multi-tone systems.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS

In one embodiment of the multi-tone system with oversampled precoders, a data transmission circuit includes an interface for receiving a data stream for transmission, a data stream splitter that splits the data stream and generate multiple substreams, and a plurality of parallel data preparation circuits. Each substream has a respective symbol rate that is lower than a symbol rate of the data stream. Each data preparation circuit prepares a respective substream for transmission and generates a respective sub-channel signal. At least a first data preparation circuit of the plurality of parallel data preparation circuits includes a first analog filter for filtering a first substream. The first analog filter operates at the sample rate greater than the respective symbol rate of the first substream. The first analog filter provides pre-emphasis of the respective sub-channel signal and attenuation of signals outside of a respective band of frequencies corresponding to the respective sub-channel signal. The data transmission circuit also includes a combiner for combining respective sub-channel signals to generate a data transmission signal.

In some embodiments, the first analog filter is an FIR filter.

In some embodiments, the sample rate of the first analog filter corresponds to fractionally spaced equalization. In some embodiments, the sample rate of the first analog filter is an integer multiple of the respective symbol rate of the first substream. In other embodiments, the sample rate of the first analog filter is a half-integer multiple of the respective symbol rate of the first substream.

In some embodiments, first analog filters in two or more data preparation circuits are coupled to one another in order to reduce interference between two or more respective sub-channel signals. In some embodiments, at least one data preparation circuit further includes at least a second analog filter. An output of the second analog filter is coupled to another data preparation circuit where it is combined with an output of the first analog filter in the other data preparation circuit in order to reduce interference between two or more respective sub-channel signals.

In some embodiments, at least the first data preparation circuit of the plurality of parallel data preparation circuits includes a first analog filter matrix instead of the first analog filter. A first portion of the first analog filter matrix provides pre-emphasis of the respective sub-channel signal and attenuation of signals outside of the respective band of frequencies corresponding to the respective sub-channel signal. A second portion of the first analog filter matrix generates a signal for reducing interference between two or more respective sub-channel signals. The first portion of the first analog filter matrix operates at a sample rate greater than the respective symbol rate of the first substream.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
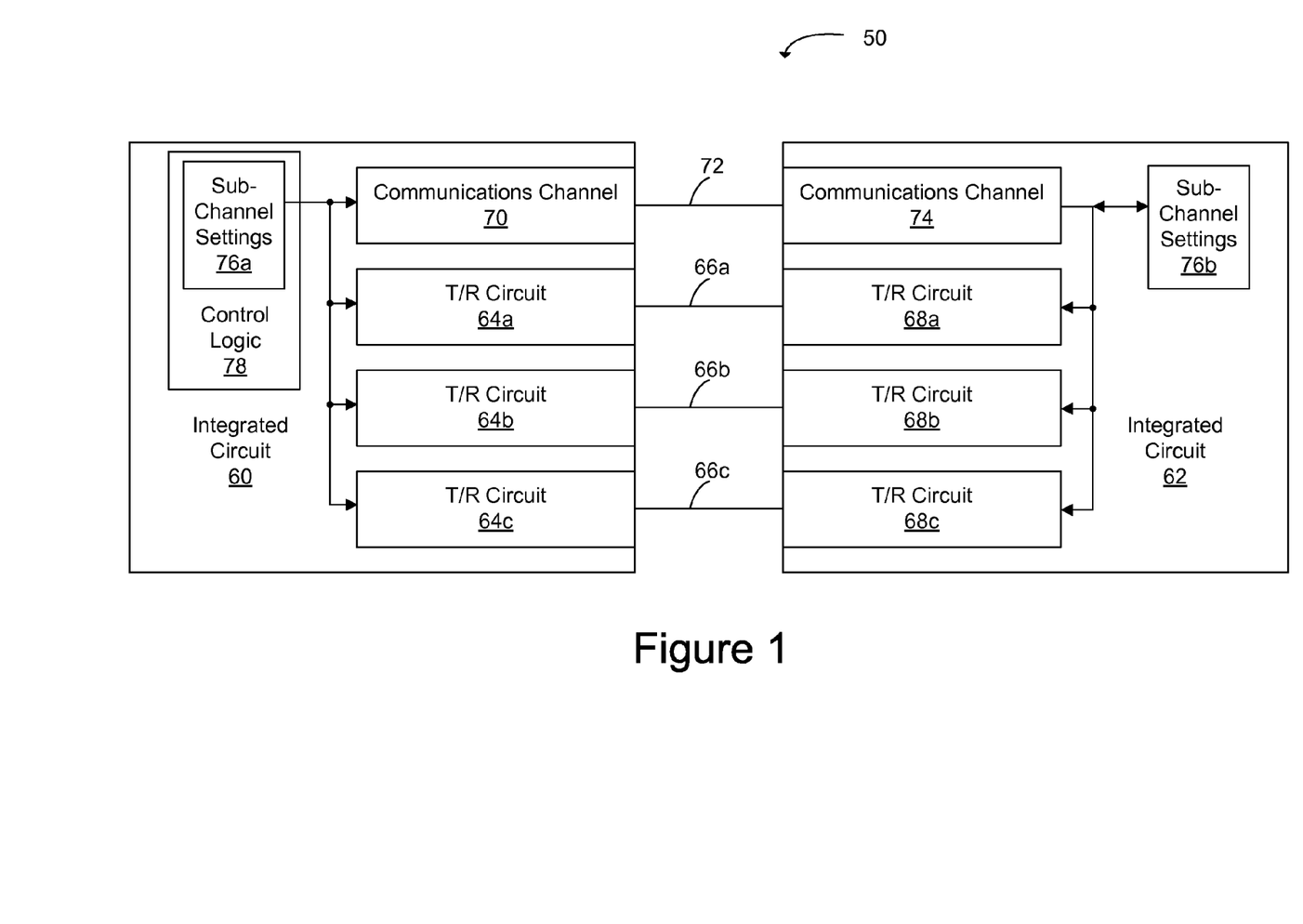
FIG. 1 is a block diagram illustrating a multi-tone system.

FIG. 1 illustrates an embodiment of a multi-tone system 50. A first integrated circuit 60 is coupled to a second integrated circuit 62 via a first communication channel or link. The first integrated circuit 60 has a plurality of data transmission and/or receiving circuits 64, henceforth denoted as data transmission/receiving circuits 64, for transmitting and receiving data to and from the second integrated circuit 62. Each data transmission/receiving circuit, such as data transmit/receive circuit 64a, has circuitry corresponding to one or more sub-channels. Each sub-channel has a corresponding respective band of frequencies. The second integrated circuit 62 has a plurality of data transmission and/or receiving circuits 68, henceforth denoted as data transmission/receiving circuits 68, for transmitting and receiving data to and from the first integrated circuit 60. Each data transmission/receiving circuit, such as data transmit/receive circuit 68a, has circuitry corresponding to one or more sub-channels.

In some embodiments, at least one respective band of frequencies corresponding to each respective sub-channel does not overlap the respective bands of frequencies corresponding to other sub-channels. In an exemplary embodiment, the band of frequencies for each sub-channel is 0.5 GHz wide and sub-channels are spaced every 1 GHz. In other embodiments, the band of frequencies and frequency spacing of one or more respective sub-channels are larger or smaller than the aforementioned values, or are adjustable. In some embodiments, the respective bands of frequencies for two of more sub-channels may be separated by a guardband of frequencies. In some embodiments, one or more guardbands of frequencies may be adjustable.

In the system 50, the first communication channel is illustrated as a data bus having a plurality of signal lines 66. In particular, the data bus has three signal lines 66. In some embodiments, there may be one, two or more than three signal lines 66. A respective signal line, such as signal line 66a, may be shared by more than one data transmission/receiving circuit 64 and/or more than one data transmission/receiving circuit 68.

Figure 2A:
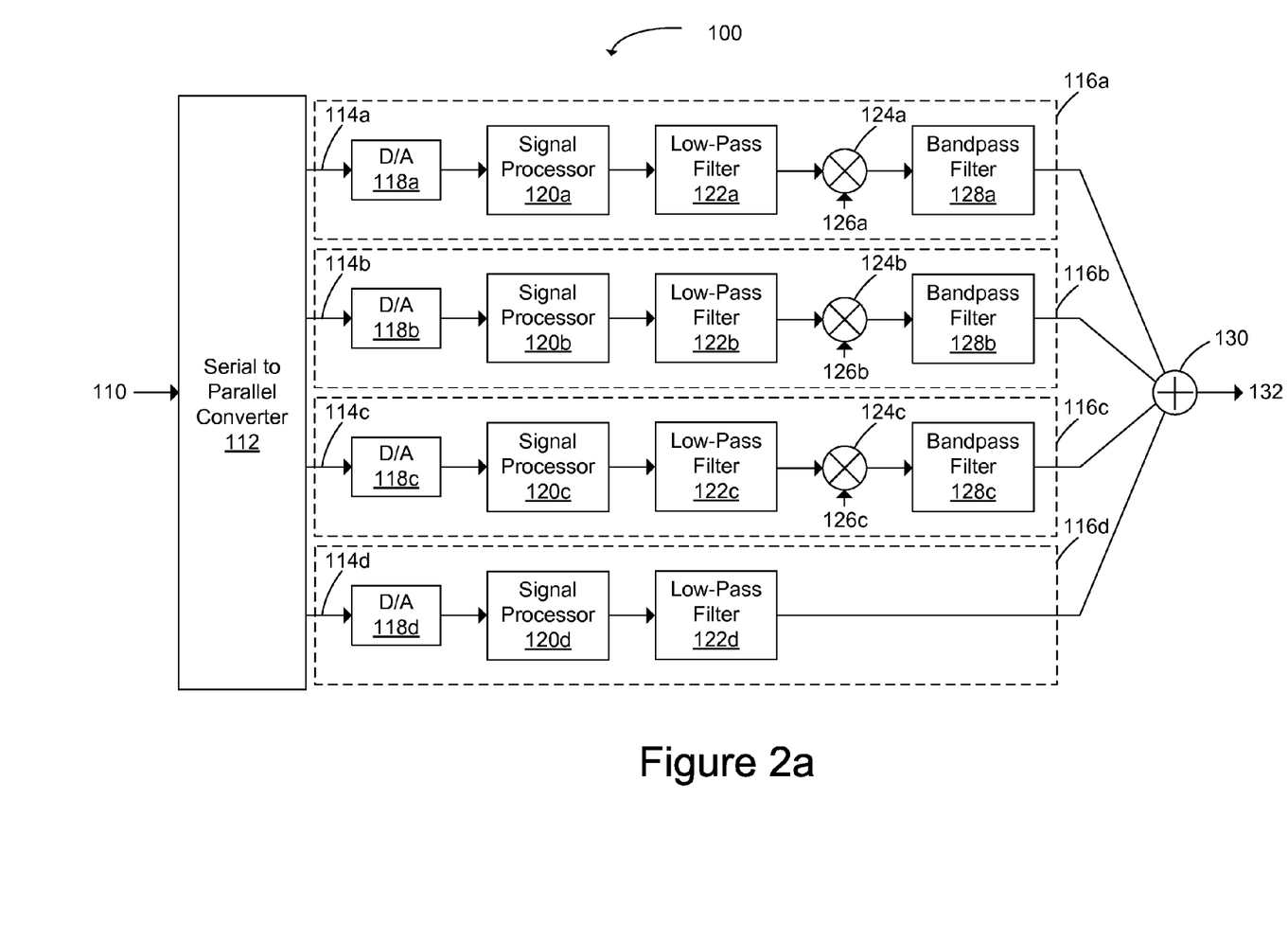
FIG. 2a is a block diagram illustrating a transmission circuit in a multi-tone system.
Figure 2B:
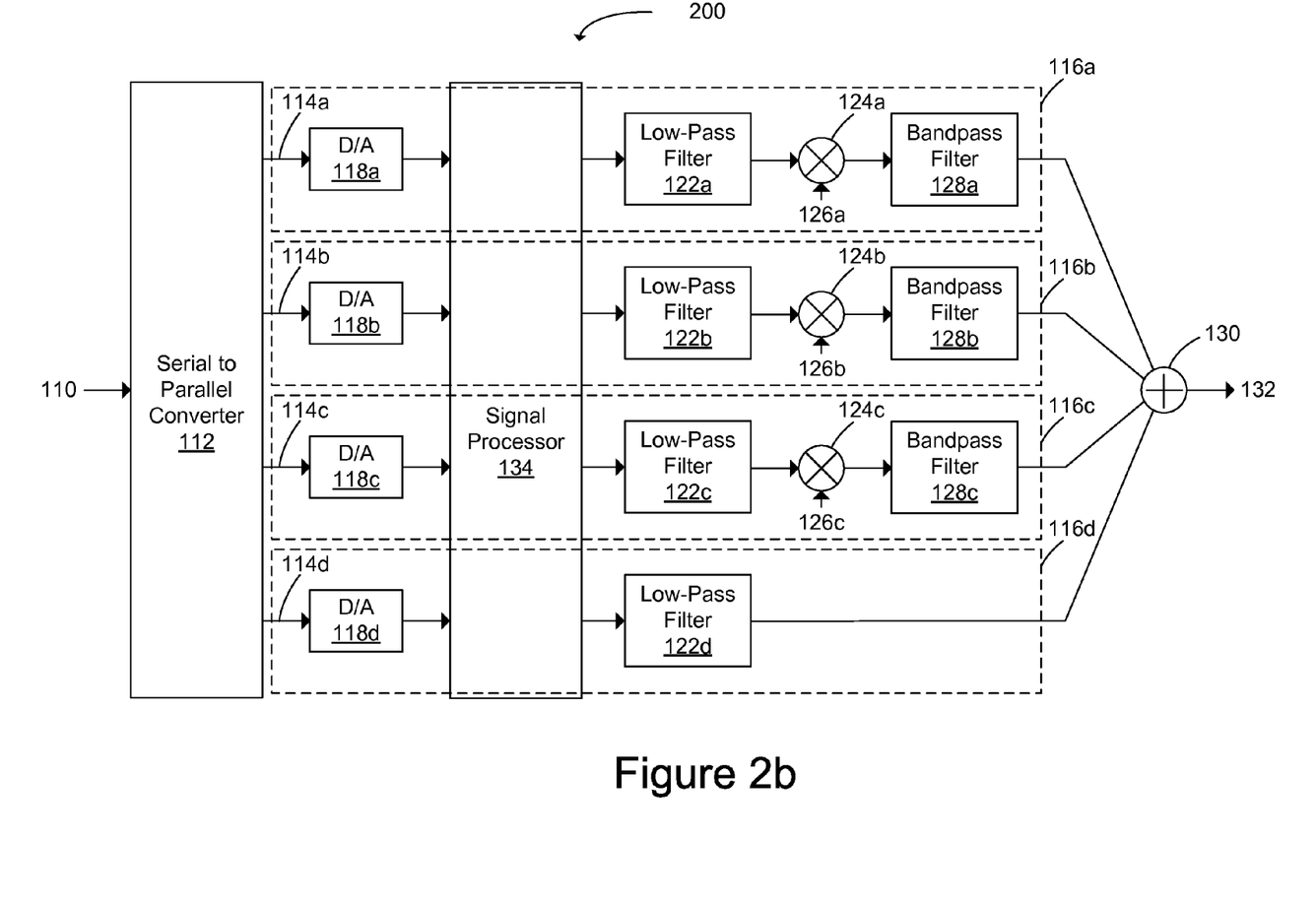
FIG. 2b is a block diagram illustrating a transmission circuit in a multi-tone system.

Each data transmission/receiving communication circuit, such as data transmission/receiving circuit 64a, has one or more sub-channel circuits, such as baseband circuit 116d in FIGS. 2a and 2b and passband circuit 116a in FIGS. 2a and 2b. The respective baseband circuit corresponds to a baseband sub-channel in the first communications channel. In some embodiments, such as those where the first communications channel is ac-coupled, the respective baseband sub-channel does not contain DC. The passband sub-channel corresponds to a passband sub-channel in the first communications channel.

The baseband sub-channel circuit and the passband sub-channel circuit in a respective data transmission/receiving circuit, such as data transmission/receiving circuit 64a, may be adjusted based on one or more performance characteristics of the first communication channel corresponding to one or more respective signal lines, such as signal line 66a. Control logic 78 in the first integrated circuit 60 determines the sub-channel settings for the respective data transmission/receiving circuit. The sub-channel settings may be stored in a memory 76a in the first integrated circuit 60. In some embodiments, the memory 76a is separate from the control logic 78, while in other embodiments the memory 76a is embedded within the control logic 78.

Adjustments by the control logic 78 may include adjustments to one or more sub-channel low-pass filter corner frequencies, one or more sub-channel clock rates, one or more sub-channel bandpass filter bandwidths, one or more sub-channel carrier frequencies, one or more sub-channel fundamental frequencies (e.g., for embodiments with a square wave carrier signal) and one or more filter responses. Adjustments by the control logic 78 may also include adjustments to how much data is allocated to different data transmission/receiving circuits 64 and 68 and/or different sub-channels in the respective data transmission/receiving circuit.

The system 50 may include a second communications channel for communicating information, including communications channel circuit 70, communications channel circuit 74 and signal line 72. In some embodiments, the information may include sub-channel settings for one or more data transmission/receiving circuits 68 in the second integrated circuit 62. In other embodiments, the information may include data used to train at least one of the data transmission/receiving circuits 64 or 68 during a training mode of operation.

In some embodiments, the sub-channel settings are stored in a memory 76b in the second integrated circuit 62. In the system 50, the second communication channel includes the additional signal line 72. In some embodiments, the second communication channel may include two or more additional signal lines. In some embodiments, each pairing of data transmission/receiving circuits in the first integrated circuit 60 and the second integrated circuit 62 may have a separate signal line in the second communications channel for communicating respective sub-channel circuit settings.

In other embodiments, sub-channel circuit settings and/or data used to train at least one of the one data transmission/receiving circuits 64 or 68 may be communicated using one or more of the signal lines 66 in the first communication channel. For example, the sub-channel circuit settings may be transmitted from the first integrated circuit 60 at a slow data rate that is easily received by the second integrated circuit 62. Alternatively, the sub-channel circuit settings may be transmitted from the first integrated circuit 60 to the second integrated circuit 62 using a dedicated small-bandwidth sub-channel.

The system 50 in FIG. 1 shows three data transmission/receiving circuits 64 and three data transmission/receiving circuits 68. In other embodiments, the system 50 may have one, two or more than three data transmission/receiving circuits 64 and/or data transmission/receiving circuits 68.

The system 50 in FIG. 1 illustrates the multi-tone system for inter-chip communication. In some embodiments, the multi-tone system may be used for intra-chip communication, for example, between modules in an integrated circuit, such as the first integrated circuit 60.

FIG. 2a illustrates an embodiment of a data transmission circuit 100. The data transmission circuit 100 uses multi-tone communication. A data stream 110 having a symbol rate is distributed by serial-to-parallel converter 112 into a plurality of substreams 114. The serial-to-parallel converter 112 functions as a data splitter. The substreams each have a symbol rate that is less than the symbol rate of data stream 110. The substreams are coupled to data preparation or sub-channel circuits 116. The sub-channel circuit 116d is the baseband circuit. Sub-channel circuits 116a, 116b and 116c are passband circuits. In some embodiments, the data transmission circuit 100 may include one or more additional passband circuits. In other embodiments, the data transmission circuit 100 may only include the baseband circuit 116d and the passband circuit 116a.

The sub-channel circuits 116 each include a digital-to-analog (D/A) converter 118, signal processor 120 and low-pass filter 122. In some embodiments, the function of the D/A converter 118 may be incorporated into the signal processor 120. The passband sub-channel circuits 116a, 116b and 116c each include a mixer 124 and a carrier signal 126 generated by one or more signal generators (not shown). Each mixer 124 shifts signals corresponding to a respective substream 114 to the band of frequencies corresponding to a respective passband sub-channel. The resulting signals are filtered in bandpass filter 128. This attenuates signals outside of the respective band of frequencies corresponding to the respective sub-channel. Signals from the sub-channel circuits 116 are combined in combiner 130 to generate data transmission signal 132.

In some embodiments, one or more low-pass filters 122 and/or one or more bandpass filters 128a-c may be excluded from one or more of the sub-channel circuits 116. In other embodiments, one or more additional bandpass filters 128 a-c may be included in one or more of the passband circuits 116a-116c. In addition, the bandpass filter 128 in the sub-channel circuit 116 having the highest frequencies may be replaced with a high-pass filter.

In some embodiments, the mixer 124 includes one or more signal multipliers. In some embodiments, the carrier signal 126 may be a respective sinusoidal or harmonic signal having a respective carrier frequency. In other embodiments, the carrier signal 126 may be a respective square-wave signal having a respective fundamental frequency. In other embodiments, the carrier signal 126 is a respective vector signal corresponding to a respective finite-length sequence. In some embodiments, the finite-length sequence is a row in a Hadamard matrix of order N. In some embodiments, the symbol rates of the respective substreams, the clock rates of the respective sub-channel circuits 116, the signal processing 120, the low-pass filter 122, the carrier signal 126, and/or the bandpass filter 128 in one or more sub-channel circuits 116 are adjustable.

FIG. 2b illustrates an embodiment of a data transmission circuit 200. Comparing this embodiment with the embodiment illustrated in FIG. 2a, the signal processors 120 (FIG. 2a) in the sub-channels circuits 116 have been combined into a multiple input, multiple output signal processor 134. In some embodiments of the data transmission circuit 200, the function of the D/A converter 118 may be incorporated into the signal processor 134.

In some embodiments of the data transmission circuit 100 (FIG. 2a) and/or the data transmission circuit 200 (FIG. 2b), one or more sub-channel circuits 116 may modulate one or more substreams 114. In some embodiments, the modulation in the respective sub-channel circuit, such as sub-channel circuit 116a, may be different from that used in one or more of the remaining sub-channel circuits 116, which is also referred to as bit-loading or approximate bit-loading. The modulation used in the respective sub-channel circuit may be adjusted or disabled based on a desired data rate and/or power consumption. Suitable modulation in the baseband circuit 116d includes two or more level pulse amplitude modulation (PAM), such as two-level PAM or four-level PAM. Suitable modulation in the passband circuits 116a, 116b and 116c includes two or more level pulse amplitude modulation (PAM), also referred to as on-off keying for binary signals, and two or more level quadrature amplitude modulation (QAM) for passbands that are in quadrature with one another. Other suitable modulation include pulse position modulation (PPM) and pulse width modulation (PWM). In some embodiments, the modulation in one or more respective sub-channel circuits in one or more of the data transmission/receiving circuits, such as data transmission/receiving circuit 64a (FIG. 1), may be different from that used in other data transmission/receiving circuits.

FIGS. 2a and 2b illustrate embodiments of data transmission circuits 100 and 200 that use so-called direct conversion. Other embodiments may use so-called heterodyne conversion, where signals are converted to one or more intermediate frequencies before conversion to baseband. In these embodiments, more than one mixer, such as the mixer 126b, in a passband circuit, such as passband circuit 116b, may be used.

In some embodiments, one or more of the sub-channel circuits 116 in data transmission circuits 100 and 200 may be adjusted or disabled to dynamically allocate bandwidth based on the desired data rate and/or power consumption.

While not explicitly shown in FIGS. 2a and 2b, the signal processor 120 and the signal processor 134 may include sub-channel transmit drivers for driving respective substreams 114 to the low-pass filters 122. In some embodiments, these sub-channel transmit drivers include analog filters, which may be implemented separately from or together with the transmit drivers. In some embodiments, the analog filters are analog multi-tap finite impulse response (FIR) filters. Analog multi-tap FIR filters may provide some pre-emphasis equalization or precoding of signals in one or more sub-channels. The frequency response of one such analog FIR filter implementation is illustrated in FIG. 6a.

Figure 6A:
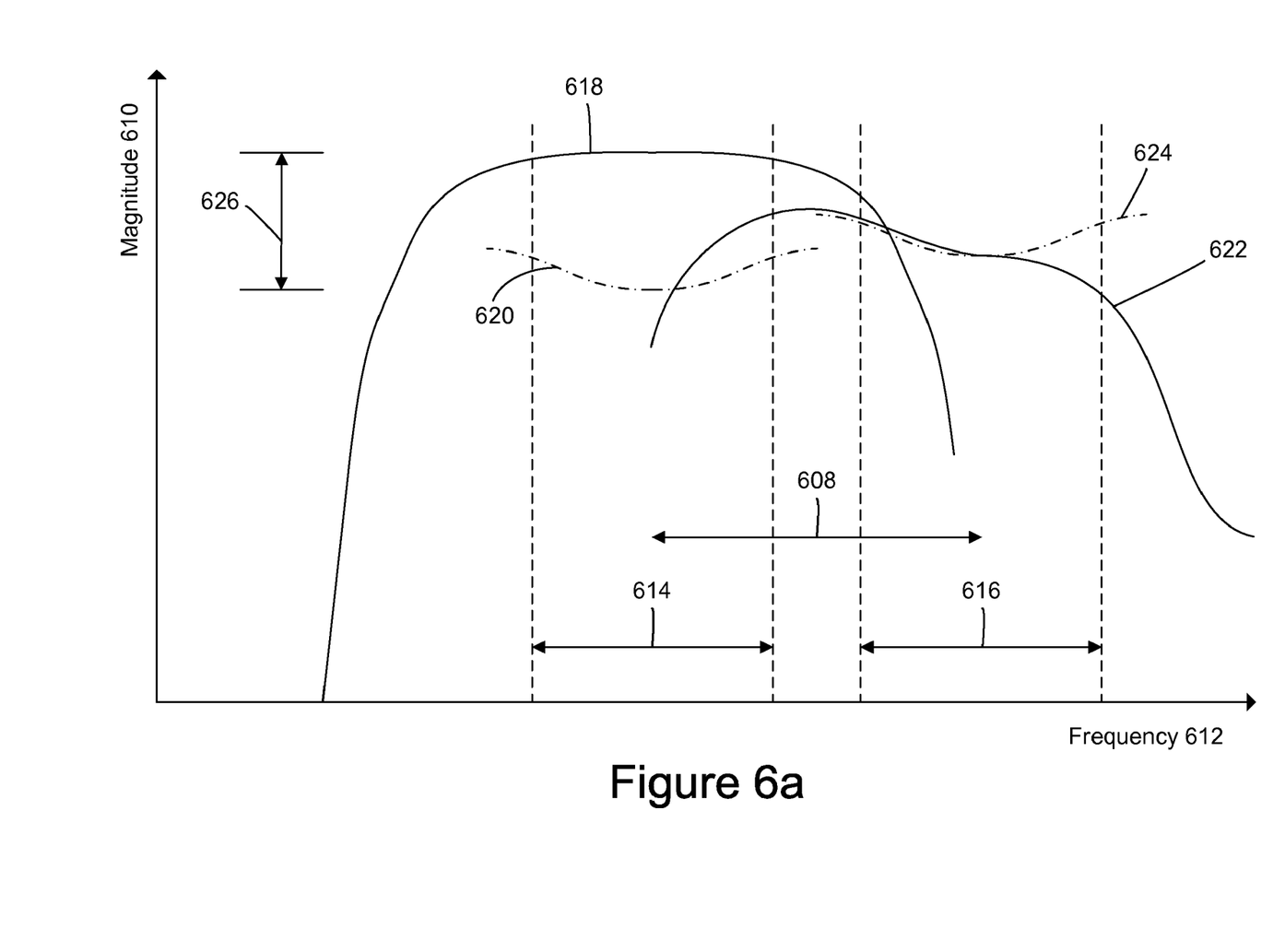
FIG. 6a is a schematic illustrating frequency responses for symbol rate and oversampled filtering in two adjacent bands of frequencies.

FIG. 6a illustrates magnitude 610 versus frequency 612 of filter responses for two adjacent sub-channels. The first sub-channel corresponds to a 1.0 GHz wide band of frequencies 614 and the second sub-channel corresponds to a 1.0 GHz wide band of frequencies 616. The two sub-channels have a frequency spacing 608 of 1.25 GHz, and thus are separated by a guardband that is approximately 0.25 GHz wide. In other embodiments the guardband between the neighboring sub-channels may be larger or smaller or even non-existent. Filter response 620 is a symbol-rate analog FIR pre-emphasis equalization or precoding of the signal in the first sub-channel, which is also referred to as an in-band signal. Filter response 624 is the symbol-rate analog FIR pre-emphasis equalization for the signal in the neighboring sub-channel, which is also referred to as an out-of-band signal. The filter response 624 at a center of the band of frequencies 616 has a higher magnitude than the filter response 620 at the center of the band of frequencies 614 in order to compensate for additional attenuation at higher frequencies.

Filter response 620 is high-pass in nature, thereby helping to compensate for the low-pass characteristic of the sub-channel. The filter response 620, however, suffers from rather large attenuation 626 (approximately 16 dB) relative to over-sampled filter response 618. In some embodiments, attenuation 626 is at least 7 dB. Furthermore, filter responses 620 and 624 corresponding to the symbol-rate implementation of the transmit drivers do not help reduce ICI relative to the filter response 624 in the second sub-channel and the filter response 620 in the first sub-channel, respectively. As a consequence, sharp analog filters and complex matrix equalization are needed for reliable data transmission, i.e., low error rates, when sub-channels are closely spaced in frequency.

Implementing the transmit drivers as oversampled analog FIR filters, for example, at twice the symbol rate, instead of as symbol-rate analog FIR filters allows the frequency responses of the transmit drivers to be shaped over a correspondingly larger frequency range. Such oversampled analog filtering in a transmission circuit, also referred to as oversampled precoding, allows the transmit drivers to both provide pre-emphasis channel equalization and attenuation of out-of-band energy to assist in reducing ICI relative to the respective filter response in the respective sub-channel. FIG. 6a illustrates one such oversampled analog FIR filter implementation.

Filter response 618 is a twice-the-symbol-rate analog FIR equalization of the sub-channel signal. Filter response 622 is the twice-the-symbol-rate analog FIR equalization for the neighboring sub-channel signal. Asymmetry of the filter response 622 reflects the complex nature of the filter response 622 (only the magnitude 610 is shown in FIG. 6a), which is used to compensate for phase dispersion at higher frequencies. The filter response 618 provides some equalization of in-band sub-channel signals and provides a fairly sharp roll-off at frequencies beyond the band of frequencies 614 corresponding to the first sub-channel. In particular, the filter response 618 has a high-pass characteristic near a center of the band of frequencies 614 corresponding to the first sub-channel and a low-pass characteristic near an edge of the band of frequencies 614. The additional roll-off at frequencies beyond the band of frequencies 614 allows the filter response 618 to have less attenuation for a respective dynamic range corresponding to the power constraint of the transmit drivers.

The use of oversampled analog FIR filters in the transmit drivers may reduce the ICI reduction requirements of the analog FIR filters. This enables the use of simpler, less costly low-pass and bandpass filters that may also have better phase linearity. In addition, the complexity of the matrix equalization can be reduced compared to the symbol-rate implementations because there is less ICI relative to the respective sub-channel signal to cancel, since relatively less energy leaks into the adjacent or neighboring sub-channels due to the roll-off of the transmit driver filters. On balance, the overall system performance is improved, especially at high data rates.

In some embodiments, the sample rate of at least one transmit driver analog FIR filter corresponds to fractional equalization. In some embodiments, the sample rate of at least one transmit driver analog FIR filter is a half-integer multiple (e.g., 1.5, 2.5, etc.) of the symbol rate of the respective substream. In other embodiments, the sample rate of at least one transmit driver analog FIR filter is an integer multiple, e.g. 2, 3, 4 or more times, of the symbol rate of the respective substream. In yet other embodiments, the sample rate of the first analog filter is M/N times the respective symbol rate of the first substream, where M and N are integers and M is greater than N.

Figure 6B:
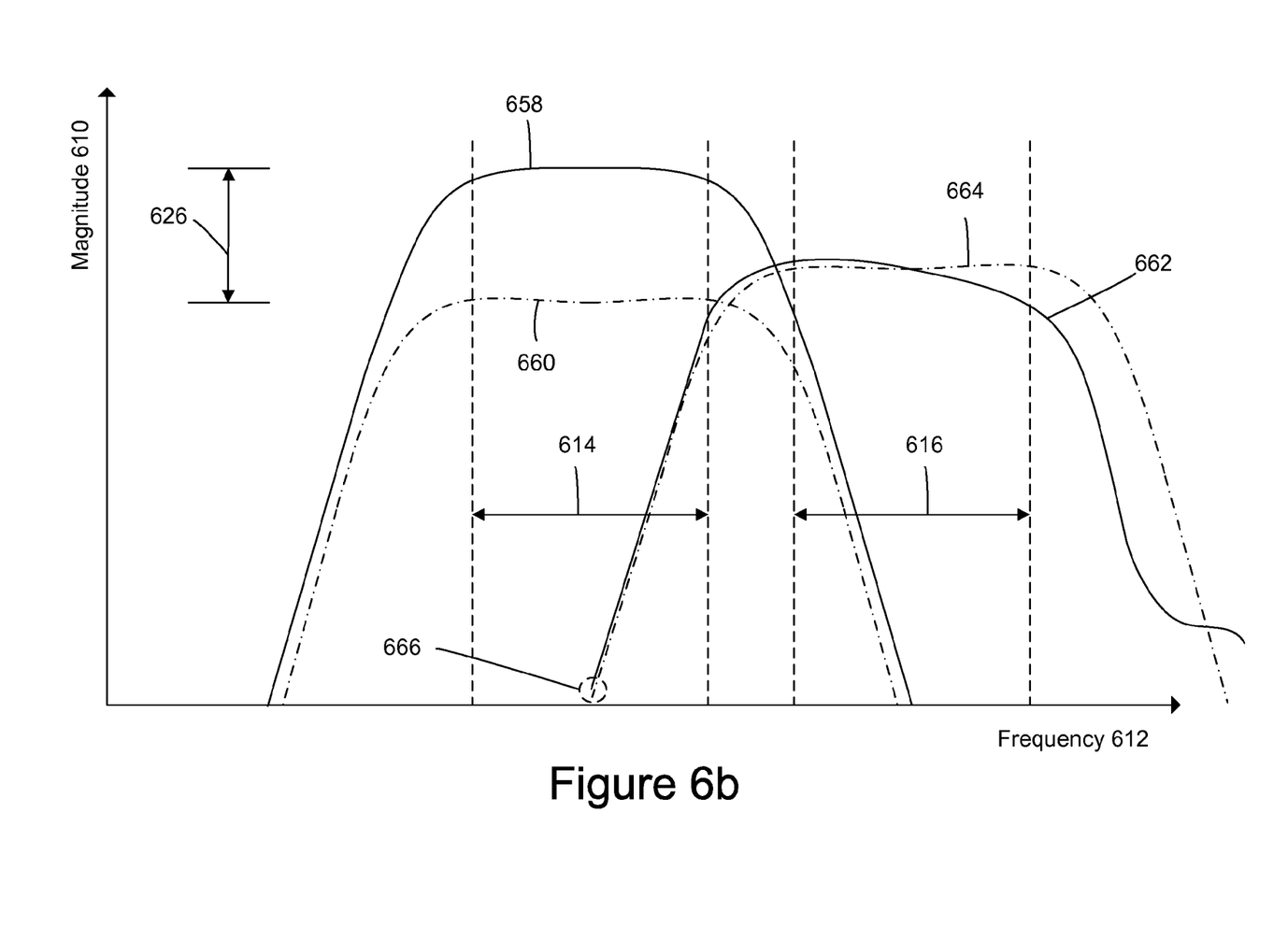
FIG. 6b is a schematic illustrating frequency responses for symbol rate and oversampled filtering in two adjacent bands of frequencies.

FIG. 6b illustrates the combined frequency response of the analog FIR filters in the signal processors 120 (FIG. 2a) or 134 (FIG. 2b) and the low-pass filters 122. Filter response 660 corresponds to the in-band symbol-rate analog FIR filter and filter-response 664 corresponds to the out-of-band symbol-rate analog FIR filter. Filter response 658 corresponds to the in-band twice-the-symbol-rate analog FIR filter and filter-response 662 corresponds to the out-of-band twice-the-symbol-rate analog FIR filter. Note that while the absolute magnitude of ICI 666 (i.e., the attenuation of the out-of-band signals corresponding to the second band of frequencies 616) at the center of the first band of frequencies 614 in the symbol-rate and the twice-the-symbol-rate implementations is essentially the same (some −70 dB, which is well below the noise floor of the system), a signal and a signal-to-noise ratio in the center of the first band of frequencies 614 is significantly improved.

Figure 3:
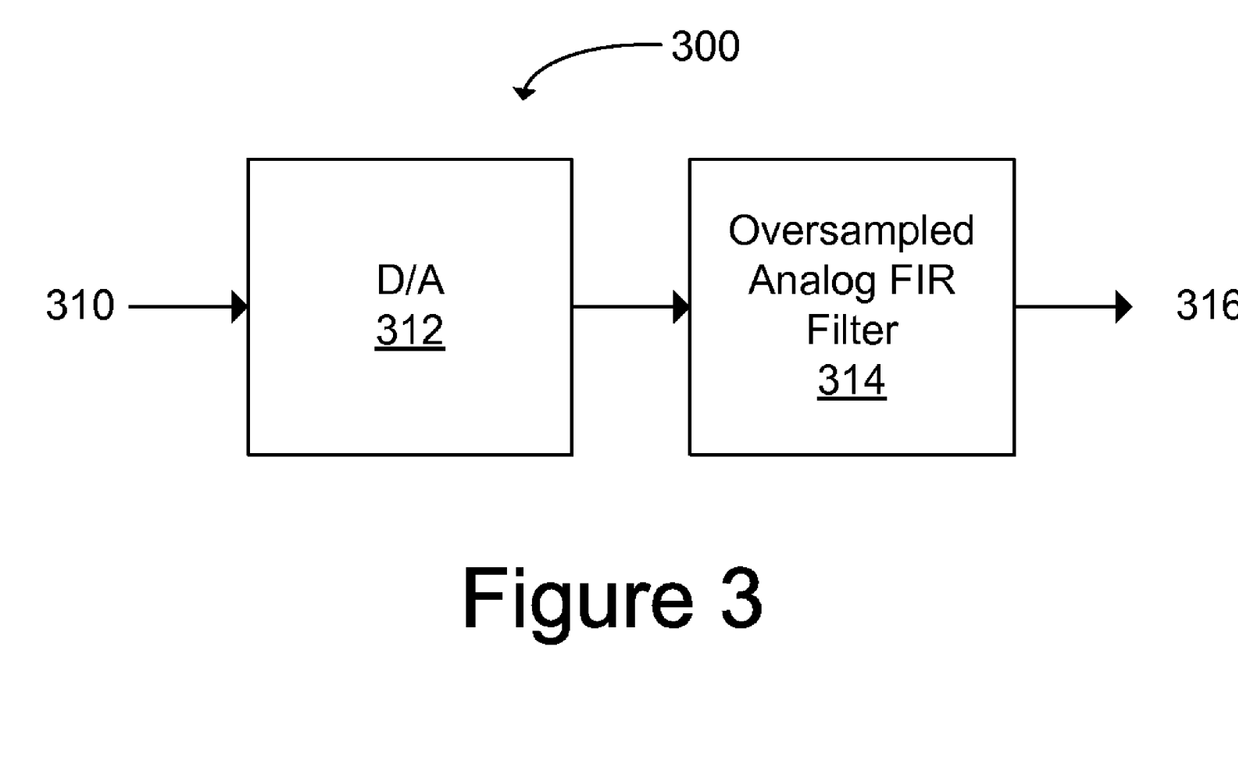
FIG. 3 is a block diagram illustrating an oversampled precoder.

FIG. 3 illustrates an embodiment 300 of oversampled analog FIR filtering in signal processor 120 (FIG. 2a) and the signal processor 134 (FIG. 2b). A respective substream 310, such as the substream 114a (FIG. 2a), is converted in digital-to-analog converter 312. An output signal of the D/A converter 312 is filtered in oversampled analog FIR filter 314 to generate signal 316. Alternatively, in some embodiments the function of the D/A converter 312 may be incorporated into the oversampled analog FIR filter 314. In other embodiments, the oversampled analog FIR filter 314 may be preceded by an additional; symbol-spaced analog filter.

Figure 4A:
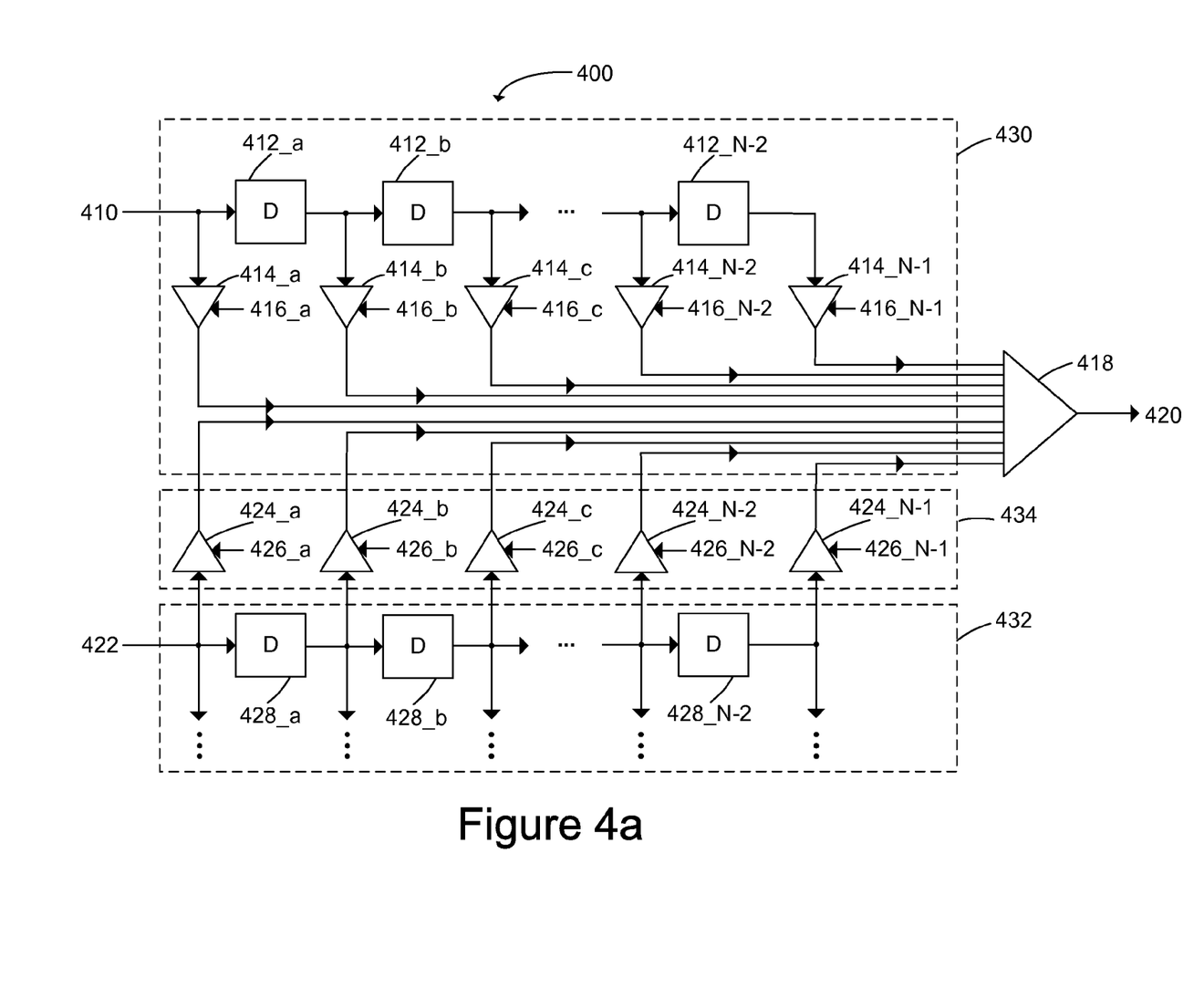
FIG. 4a is a block diagram illustrating analog filtering.

FIG. 4a illustrates an embodiment 400 of the oversampled analog FIR filter. A first substream 410 is filtered in first oversampled analog FIR filter 430. A second substream 422 is filtered in second oversampled analog FIR filter 432. The first oversampled analog FIR filter 430 and the second oversampled analog FIR filter 432 are coupled to one another using coupling 434. The coupling 434 generates signals for reducing cross-talk interference between sub-channel signals corresponding to the second substream 422 and the first substream 410. The first oversampled analog FIR filter 430 has a plurality of delay elements 412 and weighted drivers 414. Weights of the weighted drivers 414 are adjusted with settings 416. In some embodiments, the settings 416 correspond to gains in the weighted drivers 414. Continuous current outputs from the weighted drivers 414 are combined in analog combiner 418 to generate output signal 420.

The second oversampled analog FIR filter 432 has delay elements 428, weighted drivers (not shown) and settings (not shown). The coupling 434 includes weighted drivers 424 and settings 426. Weights of the weighted drivers 424 are adjusted with the settings 426. In some embodiments, the settings 426 correspond to gains in the weighted drivers 424. Continuous current outputs from the weighted drivers 424 are also combined in the analog combiner 418 to generate the output signal 420.

In some embodiments, the delay elements 412 and the delay elements 428 may be clocked at different rates. In an exemplary embodiment, the delay elements 412 may be latches and the delay elements 428 may be flip flops. In this way, the first oversampled analog FIR filter 430 operates at twice the rate of the second oversampled analog FIR filter 432 even though the oversampled analog FIR filters 430 and 432 have a common clock signal. In other embodiments, one or more analog FIR filters for filtering one or more sub-channel signals may be operated using a different clock signal than that used by one or more analog FIR filters that filter one or more other sub-channel signals. In some embodiments, clock signal for one or more analog FIR filters may be determined and/or adjusted by the control logic 78 (FIG. 1) based on the symbol rates of the substreams allocated to respective sub-channels.

In some embodiments, symbol-rate samples that feed the analog FIR filter that operates at multiples of the symbol-rate, such as the first oversampled analog FIR filter 430, are zero padded to satisfy the multi-symbol-rate throughput requirement of the analog FIR filter. In alternative embodiment, in case the analog FIR filter operates at twice the symbol-rate, the incoming samples can be integer precoded to create a 1+D response and then fed into the analog FIR filter. For higher oversampling ratios, other precoding functions may also be used.

In some embodiments, the settings 416 and 426, as well as the settings (not shown) in the second oversampled analog FIR filter 432, are determined concurrently or simultaneously. Since the oversampled analog FIR filters 430 and 432 are determined with a knowledge of the interference signals corresponding to the adjacent sub-channel, the equalization and absolute or relative ICI reduction may be improved. In other embodiments, the settings 416 and 426, as well as the settings (not shown) in the second oversampled analog FIR filter 432, are determined separately without knowledge of one interference signals corresponding to the adjacent sub-channel or sub-channels. Values representing the settings 416 and 426 (and the FIR filter settings for other sub-channels as well) may be stored in a memory or other storage device(s) (not shown) in or near the oversampled analog FIR filter 400.

Figure 4B:
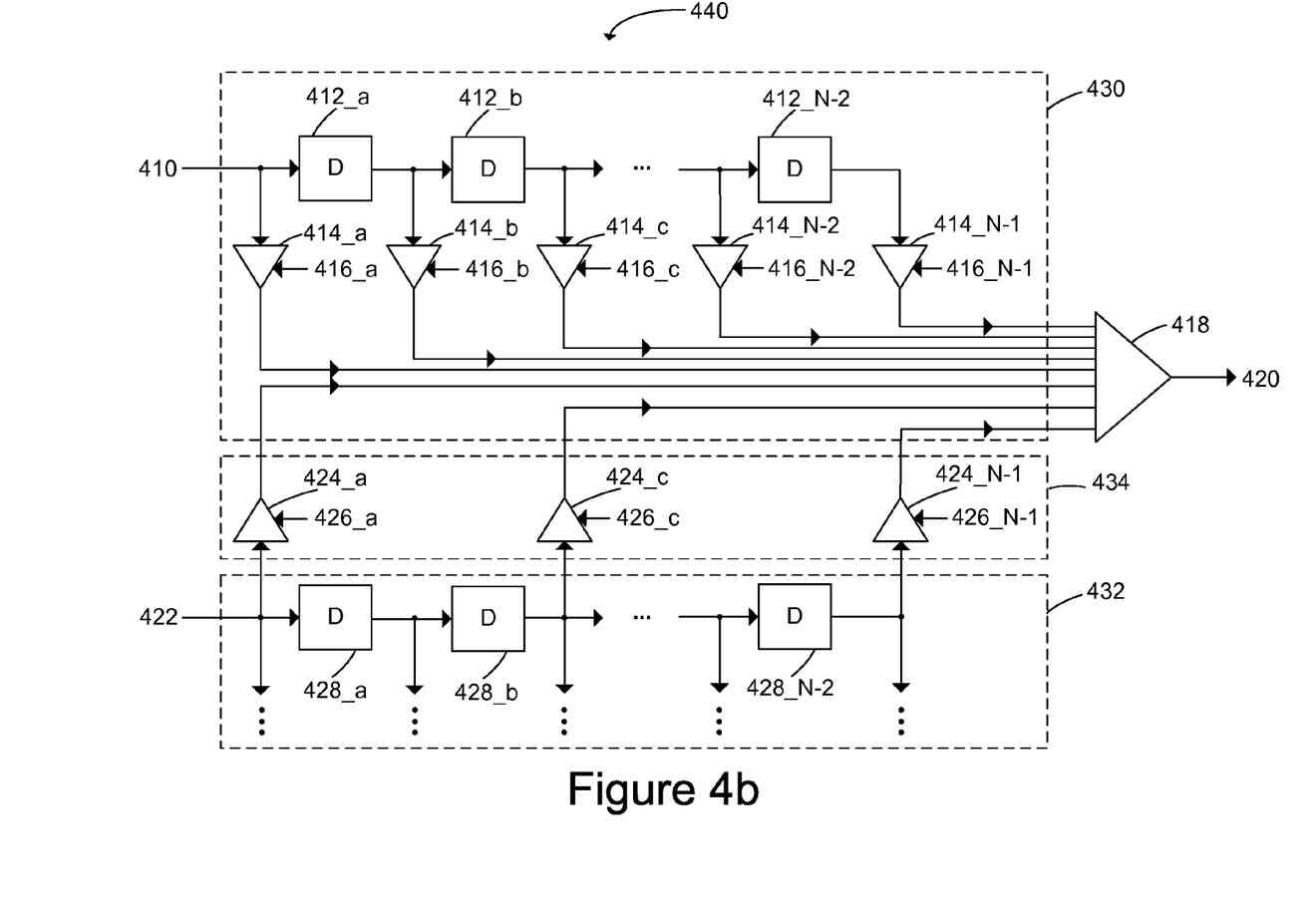
FIG. 4b is a block diagram illustrating analog filtering.

The coupling 434 need not be operated at the same rate as the first oversampled analog FIR filter 430 or the second oversampled analog FIR filter 432. This may be implemented by using a different clock signal than is used for the first oversampled analog FIR filter 430 or the second oversampled analog FIR filter 432. FIG. 4b illustrates another embodiment 440, where every other weighted driver 424 is removed from the coupling 434. In other embodiments, one or more of the weighted drivers 424 are present but are not activated. In other embodiments, more than every other weighted driver 424 may be removed or not activated. In other embodiments, adjacent delay elements 428 in the second analog FIR filter 432, such as delay element 428_a and delay element 428_b may be combined into a single delay element if, in this example, the second oversampled analog FIR filter 432 runs at half the rate of the first oversampled analog FIR filter 430.

Figure 5:
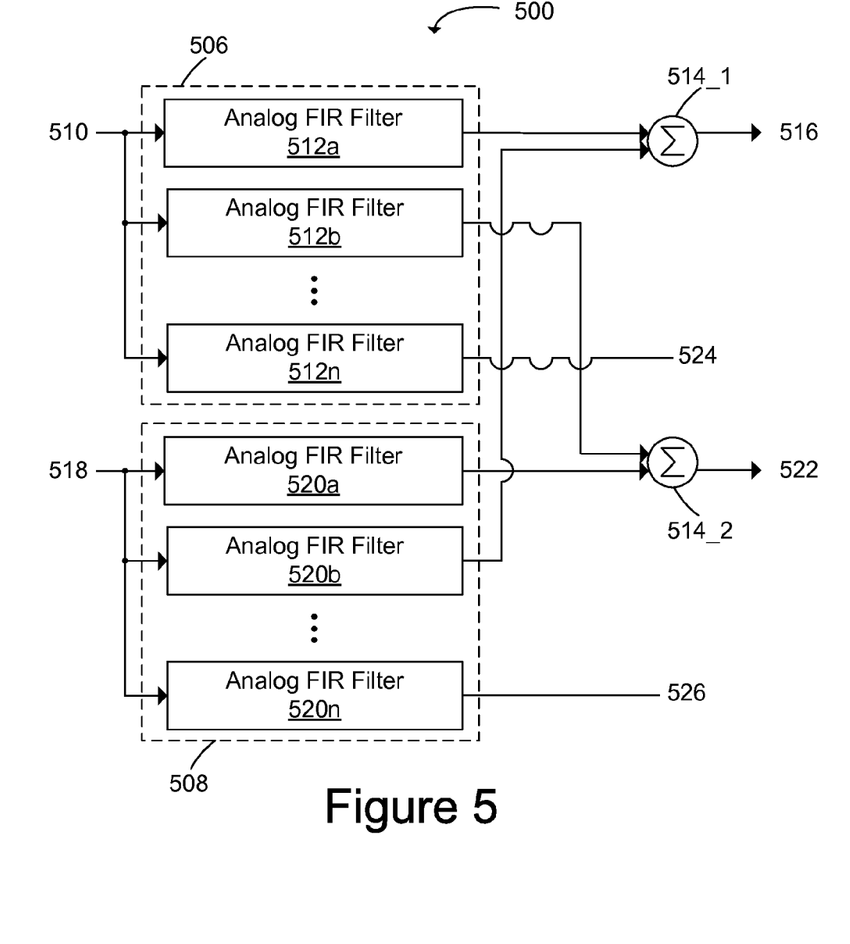
FIG. 5 is a block diagram illustrating analog filtering.

FIG. 5 illustrates another embodiment 500 of the oversampled analog FIR filter. A first substream 510 is filtered in analog FIR filter matrix 506, including oversampled in-band analog FIR filter 512a and out-of-band analog FIR filters 512b-512n. A second substream 518 is filtered in analog FIR filter matrix 508, including oversampled in-band analog FIR filter 520a and out-of-band analog FIR filters 520b-520n. An output signal from out-of-band analog FIR filter 520b is combined with an output from oversampled in-band analog FIR filter 512a in analog combiner 514_1 to produce output signal 516. In some embodiments, output signals from one or more additional out-of-band analog FIR filters in other analog filter matrices (not shown) may be combined in analog combiner 514_1. The oversampled in-band analog FIR filter 512a provides pre-emphasis of sub-channels signals corresponding to first substream 510 and attenuation of signals outside of the band of frequencies corresponding to this sub-channel. The output signal from out-of-band analog FIR filter 520b reduces interference between the sub-channel signals corresponding to the substreams 510 and 518.

Similarly, an output signal from out-of-band analog FIR filter 512b is combined with an output signal from oversampled in-band analog FIR filter 520a in analog combiner 514_2 to produce output signal 522. In some embodiments, output signals from one or more additional out-of-band analog FIR filters in other analog filter matrices (not shown) may be combined in analog combiner 514_2. Output signal 524 and output signal 526 from out-of-band analog FIR filters 512n and 520n, respectively, are coupled to other analog combiners (not shown) in other analog filter matrices (not shown). In one embodiment, analog filter matrix 506 may only contain oversampled in-band analog FIR filter 512a and out-of-band analog FIR filter 512b, and analog filter matrix 508 may only contain oversampled in-band analog FIR filter 520a and out-of-band analog FIR filter 520b, i.e., there are only two substreams 510 and 518 corresponding to two sub-channel signals. In some embodiments, one or more of the out-of-band analog FIR filters, such as analog FIR filters 512b-512n and analog FIR filters 520b-520n, may be oversampled. On the other hand, in some embodiments, one or more of the out-of-band analog FIR filters, such as analog FIR filters 512b-512n and analog FIR filters 520b-520n, may be sampled at the symbol rate of the corresponding substream 510, 518. More generally, in some embodiments one or more of the FIR filters 512 and 520 may be sampled at a different rate than one or more of the other FIR filters 512 and 520.

The settings for the weighted drivers in one or more analog FIR filters, such as oversampled analog FIR filter 512a, may be determined independently or concurrently with the settings for the weighted drivers in one or more other analog FIR filters by using a test pattern for one or more substreams, such as substream 510. During training of one or more analog FIR filters, one or more other substreams, such as substream 518, may correspond to a null pattern and the settings for the weighted drivers for one or more other analog FIR filters may be set such that no current is output from these weighted drivers. Settings for one or more analog FIR filters may be determined and/or adjusted by the control logic 78 (FIG. 1).

Figure 7:
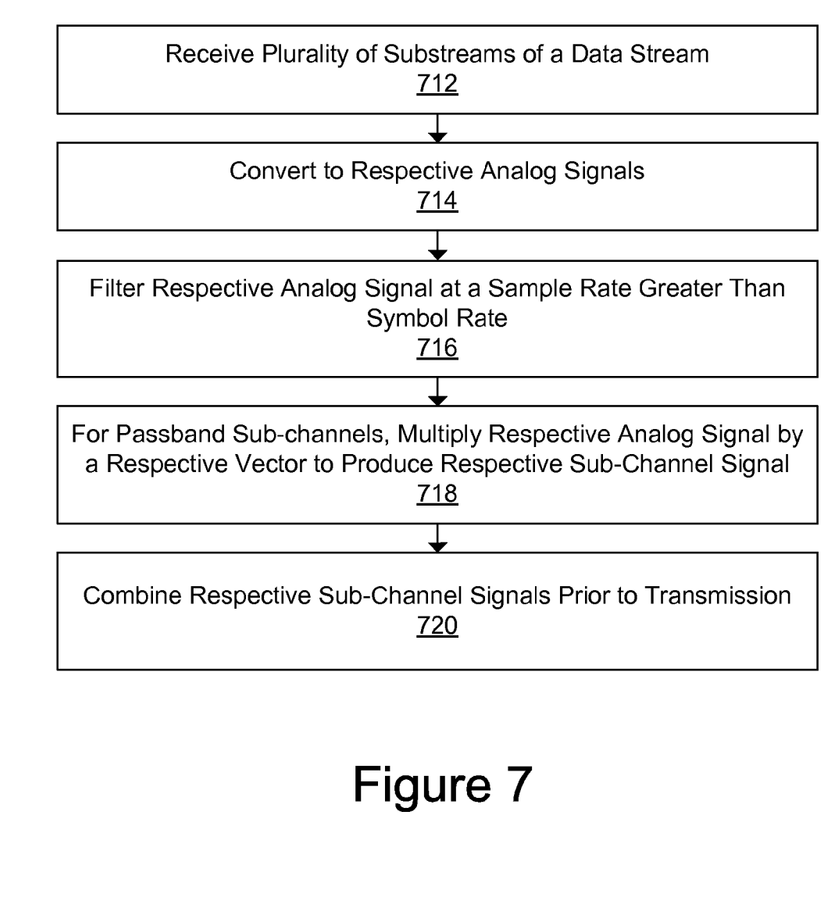
FIG. 7 is a flow diagram illustrating a multi-tone system with oversampled precoders.

FIG. 7 is a flow diagram illustrating an embodiment of a method or process for the multi-tone system with oversampled precoders. A plurality of substreams of a data stream are received 712. The substreams are converted to respective analog signals 714. A respective analog signal is analog filtered at a sample rate greater than the symbol rate of the respective substream 716, i.e., it is fractionally sampled or oversampled. For passband sub-channels, the respective analog signal is multiplied by a respective vector to produce a respective sub-channel signal 718. Respective sub-channel signals are combined prior to transmission 720. Tasks 712 through 720 may be performed continuously, in pipeline fashion, on a continuing data stream. In some embodiments, the order of these operations may be changed and/or one or more operations may be omitted.

The multi-tone system with oversampled precoders and the related method are well-suited for use in communication between two or more semiconductor chips or dies, for example, in electronic interconnects and data buses. In particular, the apparatus and method are well-suited for use in improving the utilization of available bandwidth in communication between semiconductor chips on the same printed circuit board (PCB) or between semiconductor chips on different printed circuit boards that are connected through a backplane, signal lines or a coaxial cable at data rates exceeding multiple Gbps (gigabits per second), for example, rates of at least 2, 5 or 10 Gbps.

The multi-tone system with oversampled precoders and the method are also well-suited for use in improving communication between modules in an integrated circuit. The multi-tone system with oversampled precoders may be used in communication between a memory controller chip and a dynamic random access memory (DRAM) chip. The DRAM chip may be either on the same printed circuit board as the controller or embedded in a memory module. In addition, the multi-tone system with oversampled precoders and the method are also well-suited for use in improving communication at data rates exceeding multiple Gbps (for example, rates of at least 2, 5 or 10 Gbps) between a buffer chip and a DRAM chip, both of which are on the same memory module. The apparatus and methods described herein may also be applied to other memory technologies, such as static random access memory (SRAM) and electrically erasable programmable read-only memory (EEPROM).

Devices and circuits described herein can be implemented using computer aided design tools available in the art, and embodied by computer readable files containing software descriptions of such circuits, at behavioral, register transfer, logic component, transistor and layout geometry level descriptions stored on storage media. Data formats in which such descriptions can be implemented include, but are not limited to, formats supporting behavioral languages like C, formats supporting register transfer level RTL languages like Verilog and VHDL, and formats supporting geometry description languages like GDSII, GDSIII, GDSIV, CIF, MEBES and other suitable formats and languages. Data transfers of such files on machine readable media can be done electronically over the diverse media on the Internet or through email, for example. Physical files can be implemented on machine readable media such as 4 mm magnetic tape, 8 mm magnetic tape, 3½ inch floppy media, CDs, DVDs and so on.

The foregoing descriptions of specific embodiments of the present embodiments are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A data transmission circuit, comprising:
an interface for receiving a data stream for transmission;
a data stream splitter that splits the data stream to produce multiple substreams, each substream having a respective symbol rate that is lower than a symbol rate of the data stream;
a plurality of parallel data preparation circuits, wherein each data preparation circuit prepares a respective substream for transmission and generates a respective sub-channel signal;
wherein at least a first data preparation circuit of the plurality of parallel data preparation circuits includes a first analog filter for filtering a first substream, the first analog filter operating at a sample rate greater than the respective symbol rate of the first substream, the first analog filter providing pre-emphasis of the respective sub-channel signal and attenuation of signals outside of a respective band of frequencies corresponding to the respective sub-channel signal, wherein the first analog filter of the first data preparation circuit is coupled to another data preparation circuit to reduce interference between respective sub-channel signals of the first and other data preparation circuits; and
a combiner for combining the respective sub-channel signals to generate a data transmission signal.

2. The data transmission circuit of claim 1, wherein the first analog filter of the first data preparation circuit is an FIR filter.

3. The data transmission circuit of claim 1, wherein the sample rate of the first analog filter of the first data preparation circuit corresponds to fractionally spaced equalization.

4. The data transmission circuit of claim 1, wherein the sample rate of the first analog filter of the first data preparation circuit is an integer multiple of the respective symbol rate of the first substream.

5. The data transmission circuit of claim 1, wherein the sample rate of the first analog filter of the first data preparation circuit is a half-integer multiple of the respective symbol rate of the first substream.

6. The data transmission circuit of claim 1, at least one of the data preparation circuits further comprising an analog low-pass filter.

7. The data transmission circuit of claim 1, at least one of the data preparation circuits further comprising an analog bandpass filter, the bandpass filter attenuating signals outside of the respective band of frequencies corresponding to the respective sub-channel signal.

8. The data transmission circuit of claim 1, wherein at least one respective sub-channel signal at a center of the band of frequencies corresponding to a respective sub-channel is at least 7 dB larger than a signal produced using an analog filter operating at the respective symbol rate of the respective substream for the respective sub-channel.

9. The data transmission circuit of claim 1, wherein the first analog filter in two or more data preparation circuits are combined into a multiple-input, multiple-output analog filter in the data transmission circuit.

10. The data transmission circuit of claim 1, wherein the first data preparation circuit further comprises at least a second analog filter, an output of the second analog filter being coupled to another data preparation circuit where it is combined with an output of the first analog filter in the another data preparation circuit to reduce interference between respective sub-channel signals.

11. The data transmission circuit of claim 10, wherein the second analog filter is an FIR filter.

12. The data transmission circuit of claim 1, wherein the first analog filter of the first data preparation circuit has a high-pass characteristic near a center of the respective band of frequencies corresponding to the respective sub-channel signal and a low-pass characteristic near an edge of the respective band of frequencies corresponding to the respective sub-channel signal.

13. A method of transmitting data, comprising:
receiving a plurality of substreams of a data stream, wherein each of the respective substreams has a respective symbol rate substantially less than a symbol rate of the data stream, the plurality of substreams comprising first and second substreams;
analog filtering the first substream with a first analog filter operating at respective sample rate greater than the respective symbol rate of the first substream to produce a first sub-channel signal;
coupling the first analog filter with a data preparation circuit that analog filters another substream of the plurality of substreams to reduce interference between the first sub-channel signal and another sub-channel signal corresponding to the other substream; and
combining respective sub-channel signals prior to transmission to generate a data transmission signal,
wherein the analog filtering of the first substream provides pre-emphasis of the first substream and attenuation outside of a respective band of frequencies corresponding to the first sub-channel signal.

14. The method of transmitting data in claim 13, wherein the first analog filter is an FIR filter.

15. The method of transmitting data in claim 13, wherein the sample rate during the analog filtering of the first substream corresponds to fractionally spaced equalization.

16. The method of transmitting data in claim 13, wherein the sample rate during the analog filtering of the first substream is an integer multiple of the respective symbol rate of the respective substream.

17. The method of transmitting data in claim 13, wherein the sample rate during the analog filtering of the first substream is a half-integer multiple of the respective symbol rate of the first substream.

18. The method of transmitting data in claim 13, further comprising analog low-pass filtering of the first substream.

19. The method of transmitting data in claim 13, further comprising analog bandpass filtering the first and other sub-channel signals, wherein the analog bandpass filtering attenuates signals outside of respective bands of frequencies corresponding to the first and other sub-channel signals.

20. The method of transmitting data in claim 13, wherein at least one respective sub-channel signal at a center of the band of frequencies corresponding to the first sub-channel signal is at least 7 dB larger than a signal produced using an analog filter operating at the respective symbol rate of the first substream for the respective sub-channel.

21. The method of transmitting data in claim 13, further comprising combining an output of the analog filtering of the first substream with an output of analog filtering of another substream of the plurality of substreams to reduce interference between respective sub-channel signals.

22. The method of transmitting data in claim 13, wherein the analog filtering of the first substream has a high-pass characteristic near a center of the respective band of frequencies corresponding to the respective sub-channel signal and a low-pass characteristic near an edge of the respective band of frequencies corresponding to the respective sub-channel signal.

* * * * *